Patented Oct. 29, 1946

2,410,044

UNITED STATES PATENT OFFICE 2,410,044

HYDROCARBON CATALYZING PROCESS

Robert E. Burk and Everett C. Hughes, Cleveland Heights, Ohio, assignors to The Standard Oil Company, Cleveland, Ohio, a corporation of Ohio No Drawing. Application May 29, 1941, Serial No. 395,827

5 Claims. (Cl. 260—668)

This invention relates to catalysis, and more particularly catalysis involving operation on hydrocarbons; and it is among the objects of the invention to provide improved operating efficiency, and without undue complication. Other objects and advantages will appear as the description proceeds.

To the accomplishment of the foregoing and related ends, the invention, then, comprises the features hereinafter fully described, and particularly pointed out in the claims, the following description setting forth in detail certain illustrative embodiments of the invention, these being indicative, however, of but a few of the various ways in which the principle of the invention may be employed.

The raw material for reaction may be non-benzenoid hydrocarbons, or fractions containing them, etc., as more particularly detailed hereinafter, and it is subjected to the action of a compound catalyst of peculiar character, and heat. This catalyst may be prepared preferably from soluble salts of tin, aluminum and chromium for example by dissolving the salts in water at the rate of one mol per cent of tin, seventy-nine mol per cent of aluminum and twenty mol per cent of chromium, and the solution is treated with ammonia to neutralization. Thus, tin chloride and aluminum nitrate and chromium nitrate at the rate of 39.1, 2512, and 713 g. respectively, based on anhydrous salts, per 18.8 liters of distilled water, being brought into solution, the solution is warmed to about 55° C., and being introduced into a container provided with an agitator, concentrated ammonium hydroxide 2310 g. and 1500 g. ammonium acetate per 11.2 liters of distilled water is supplied. A blue-green precipitate is formed which is allowed to settle for about two hours, and the cake resulting is washed three times by dispersion into four liters of water, and is filtered. The precipitate is dried at about 140° F., and then under vacuum at about 400° F. A vitreous gel results. The proportions of tin and aluminum and chromium are most desirably those as above-indicated, but in general the tin need not advisably be less than one or more than thirty mol per cent and the aluminum not less than fifty nor more than ninety mol per cent, the remainder being chromium. In some instances antimony may replace all or part of the tin. Again in some instances beryllium may replace all or part of the aluminum. That is, an element from the group of laterally adjacent atomic numbers 50 and 51 in the periodic table and an amphoteric oxide forming element from the diagonally adjacent atomic numbers 4 and 13 in the periodic table and chromium may be combined. Thus, antimony chloride and aluminum nitrate and chromium nitrate at the rate of 34.2, 2512 and 713 g. respectively per 18.8 liters of distilled water, being brought into solution, the solution is warmed and with vigorous agitation ammonium hydroxide is introduced at the rate of 2310 g. of concentrated ammonium hydroxide with 1500 g. of ammonium acetate per 11.2 liters of distilled water. Again similarly, $SnCl_4$ and $Be(NO_3)_2$ and $Cr(NO_3)_3$ may be dissolved at the rate of 78.2, 1550 and 713 g. respectively per 18.8 liters of distilled water, and the solution being warmed and agitated ammonium hydroxide is introduced at the rate of 1820 g. of concentrated (28%) ammonium hydroxide and ammonium acetate 1500 g. in 11.2 liters of distilled water.

Where a part of the tin or aluminum is replaced by antimony or beryllium respectively, the catalyst involves tin and antimony and aluminum and chromium, or beryllium and aluminum and tin and chromium, or beryllium and aluminum and tin and antimony and chromium, etc., on the lines as indicated and within the proportions stated for the permissible ranges of the tin and aluminum components, the generic properties of the catalyst being maintained.

The compound catalyst is suitably granulated to provide interstitial spaces for passage of the material to be treated, in adequate contact, and is arranged in a reaction zone with adequate heating means, such that the temperature of the mass may be maintained at 800–1200° F., the raw material being passed into contact with the catalyst. The raw material generally involves non-benzenoid hydrocarbons, as aliphatic hydrocarbons or paraffins and olefins and naphthenic hydrocarbons or their mixtures, naphthas, distillates, as naphthas or distillates from stocks which are predominantly non-benzenoid, as for instance derived from Pennsylvania, Michigan, Kentucky, Ohio, Mid-Continent and the like petroleum, and therewith a gas providing hydrogen. Hydrogen as occurrent in the off-gas may be employed, or relatively pure hydrogen. The hydrogen in the catalyst zone may be from 40–400 pounds per square inch. Desirably also, butanes or four carbon atom gaseous hydrocarbons may also be supplied. Such may be provided by the off-gas, or from special sources, as convenient. When butanes are also included in the material fed to the catalyst zone in excess of the mols of normally liquid hydrocarbon charged, the pressure may be as high as 800 pounds per square inch. Conveniently, the gases formed may be recycled, by adding such gas or any portion thereof to the naphtha vapors for passage over the catalyst. Or, these gases may be added in successive portions to different, but not necessarily consecutive, bodies in apparatus where arrangement of the catalyst is in a series of bodies. With this combination of normally gaseous and normally liquid hydrocarbons, an advantageous feature is that the catalyst does not tend to accumulate coke quickly, and at the same time a component of heat is generated in situ in the catalyst bed by the combining of hydrogen in a reaction. Flow rates of naphtha may be 0.1–10 liquid volumes per volume of catalyst per hour. At the higher temperatures correspondingly shorter contact time may be used. Hydrogen is fed at the rate of 0.1–10 mols of $H_2$ per mol of naphtha. And where hydrocarbons such as butane or isobutane are provided, their feed rate may be 1–10 mols thereof per mol of naphtha.

After contacting with the catalyst, aromatic and unsaturated hydrocarbons may be extracted or partially extracted from the products, for example by mixing with a solvent having the selective character of sulphur dioxide, or a high boiling amine, or hydroxy compound, or other solvents or combinations of such solvents and the undissolved or non-benzenoid portion may be re-passed into contact with the catalyst. The gases formed may be recycled in whole or in part. The catalyst may be regenerated in situ by supplying to it, the temperature being 800–1200° F., oxygen-containing gas such as air, or air diluted with for instance flue gas.

Operating with a naphtha for instance, at 980° F. and 100 pounds pressure, in a run for five hours, and the flow rate of naphtha 1.4 v. v. h. and gas providing hydrogen at a 3:1 ratio of hydrogen to the hydrocarbon, the catalyst being a co-precipitated catalyst of 1 per cent of tin oxide, 79 per cent of aluminum oxide and 20 per cent of chromium oxide, a yield of 81.5 per cent condensate having a Kattwinkel test corresponding to 61 per cent aromatics and unsaturated hydrocarbons is obtained. In an analogous run with a catalyst of co-precipitated character involving 1 per cent of antimony oxide, 79 per cent of aluminum oxide and 20 per cent of chromium oxide, a liquid yield of 80 per cent having a Kattwinkel test of 60 per cent was obtained.

This application is a continuation, in part, and as to common subject matter, of our application Serial No. 228,005, filed Sept. 1, 1938.

Other modes of applying the principle of the invention may be employed, change being made as regards the details described, provided the features stated in any of the following claims, or the equivalent of such, be employed.

We therefore particularly point out and distinctly claim as our invention:

1. In a process of aromatizing, subjecting hydrogen and a hydrocarbon of four carbon atoms and a naphtha containing non-benzenoid hydrocarbons, at elevated pressure and a temperature of 800–1200° F., to the action of an oxide contact-mass formed from co-precipitation from dissolved salts of tin and aluminum and chromium, the tin in the contact-mass being 1–30 mol per cent.

2. In a process of aromatizing, subjecting hydrogen and a hydrocarbon of four carbon atoms and a naphtha containing non-benzenoid hydrocarbons, at elevated pressure and a temperature of 800–1200° F., to the action of an oxide contact-mass formed from co-precipitation from dissolved salts of antimony, aluminum and chromium, the antimony in the contact-mass being 1–30 mol per cent.

3. In a process of aromatizing, subjecting hydrogen and a hydrocarbon of four carbon atoms and a naphtha containing non-benzenoid hydrocarbons, at elevated pressure and a temperature of 800–1200° F., to the action of an oxide contact-mass formed from co-precipitation from dissolved salts of tin and beryllium and chromium, the tin in the contact-mass being 1–30 mol per cent.

4. In a process of aromatizing, subjecting hydrogen and a hydrocarbon of four carbon atoms and a naphtha containing non-benzenoid hydrocarbons, at elevated pressure and a temperature of 800–1200° F., to the action of an oxide contact-mass formed from co-precipitation from dissolved salts of chromium and an amphoteric oxide forming element from the group consisting of beryllium and aluminum, and another oxide forming element from the group consisting of tin and antimony, such amphoteric oxide forming element and other oxide forming element in the contact-mass being 50–90 mol per cent and 1–30 mol per cent respectively.

5. In a process of aromatizing, subjecting hydrogen and a hydrocarbon of four carbon atoms and a normally liquid non-benzenoid hydrocarbon, at elevated pressure and a temperature of 800–1200° F., to the action of an oxide contact-mass formed from co-precipitation from dissolved salts of chromium and an amphoteric oxide forming element from the group consisting of beryllium and aluminum, and another oxide forming element from the group consisting of tin and antimony, such amphoteric oxide forming element and other oxide forming element in the contact-mass being 50–90 mol per cent and 1–30 mol per cent respectively.

ROBERT E. BURK.
EVERETT C. HUGHES.